United States Patent [19]

Jorgensen

[11] Patent Number: 5,687,225
[45] Date of Patent: Nov. 11, 1997

[54] SYSTEM FOR ADDING OUTBOUND DIALING TO INBOUND CALL DISTRIBUTORS

[75] Inventor: Jacob W. Jorgensen, Teaneck, N.J.

[73] Assignee: EIS International, Inc., Stamford, Conn.

[21] Appl. No.: 526,698

[22] Filed: Sep. 11, 1995

[51] Int. Cl.⁶ ........................................... H04M 3/00
[52] U.S. Cl. ........................................ 379/265; 379/242
[58] Field of Search .............................. 379/265, 266, 379/242, 214, 216

[56] References Cited

U.S. PATENT DOCUMENTS

| | | | |
|---|---|---|---|
| 4,797,911 | 1/1989 | Szlam | 379/246 |
| 4,894,857 | 1/1990 | Szlam | 379/246 |
| 5,062,103 | 10/1991 | Davidson | 370/58.1 |
| 5,214,688 | 5/1993 | Szlam et al. | 379/67 |
| 5,425,093 | 6/1995 | Trefzger | 379/266 |
| 5,467,391 | 11/1995 | Donaghue, Jr. et al. | 379/265 |

*Primary Examiner*—Krista M. Zele
*Assistant Examiner*—Daniel S. Hunter
*Attorney, Agent, or Firm*—Lane, Aitken & McCann

[57] ABSTRACT

An add-on telephony server platform provides inter alia high-speed call switching. The outbound automatic call distributor establishes one "nailed" voice connection between the telephony served platform and trunks connected to the automatic call distributor. The outbound call distributor establishes another "nailed" voice connection between the telephony server platform and the voice sets at the agent stations assigned to outbound operations.

3 Claims, 1 Drawing Sheet

5,687,225

SYSTEM FOR ADDING OUTBOUND DIALING TO INBOUND CALL DISTRIBUTORS

BACKGROUND OF THE INVENTION

1. Field of the Invention

This invention relates to a system for adding an automatic outbound call dialing capability to inbound automatic call distributor (ACD) systems and, more particularly, to a system that connects agents to outbound calls via an inbound automatic call distributor at high switching speeds but without a need to modify the inbound call automatic distributor.

2. Description of the Prior Art

Inbound automatic call distributors are in widespread commercial use to automatically direct an inbound call to an available agent. Similarly, outbound automatic call dialers are in widespread use to automatically dial telephone numbers from a stored list of numbers and to connect answered calls to an available agent.

The prior art has recognized a potential for increased agent utilization by providing a system in which some or all agents connected to an inbound call distributor can handle outbound calls. As will be appreciated by those skilled in the art, a highly desirable feature of any system that provides outbound capability to an existing inbound system is that it does not require hardware and/or software changes to the inbound system.

U.S. Pat. No. 5,062,103 to Davidson, entitled Telephone Agent Call Management System, discloses a system for connecting inbound calls to an agent and for placing outbound calls and connecting them to an agent. The system uses a personal computer in combination with a standard ISDN switch to switch calls to an available agent. The Davidson system, while designed for both inbound and outbound operation, is not directly relevant to the problem of providing existing stand alone inbound automatic call distributors with outbound capability.

U.S. Pat. No. 5,214,688 to Szlam, entitled Method and Apparatus For Dynamic and Independent Processing of inbound and Outbound Calls, discloses a system that is roughly the same as the Davidson system. Szlam uses an automatic call distributor switch or a cross-point switch to connect inbound and outbound calls to an available agent. Like Davidson, the Szlam system is not relevant to the problem of providing outbound capability to existing automatic call distributors.

U.S. Pat. No. 5,425,093 to Trefzger, entitled System For Integrating a Standalone Inbound Automatic Call Distributor and an Outbound Automatic Call Dialer, assigned to the assignee of this invention, discloses a system that integrates an outbound dialing system with existing stand alone automatic call distributors. In the Trefzger system, blend agents connected to the inbound call distributor are assigned to inbound or outbound status based, for example, on the inbound load. Inbound calls are processed and switched to a blend agent assigned to inbound operation the same way all inbound calls are processed and switched. Outbound calls are coupled from outbound trunks over a voice link to the inbound automatic call distributor where they are processed and connected to a blend agent assigned to outbound operation. The Trefzger system is generally satisfactory for providing outbound call capabilities to existing inbound call distributors. However, the Trefzger system contemplates the use of outbound trunks connected to an outbound dialer, which is not a solution for all applications.

SUMMARY OF THE INVENTION

An object of this invention is the provision of a simple, low cost, add-on system to provide outbound call capability to inbound call distributors. An add-on system that provides high speed switching of outbound calls on the inbound call distributor trunks without alterations to the inbound call distributor hardware or software.

Briefly, this invention contemplates the provision of an add-on telephony server platform which provides inter alia high-speed call switching. The outbound automatic call distributor establishes one "nailed" voice connection between the telephony served platform and trunks connected to the automatic call distributor. The outbound call distributor establishes another "nailed" voice connection between the telephony server platform and the voice sets at the agent stations assigned to outbound operations. The telephony server platform launches calls and classifies call in progress signals in addition to providing fast switching between the first and second nailed audio connections in response to an answered call.

BRIEF DESCRIPTION OF THE DRAWINGS

The foregoing and other objects, aspects and advantages will be better understood from the following detailed description of a preferred embodiment of the invention with reference to the drawing, in which.

DETAILED DESCRIPTION OF A PREFERRED EMBODIMENT OF THE INVENTION

Figure 1:
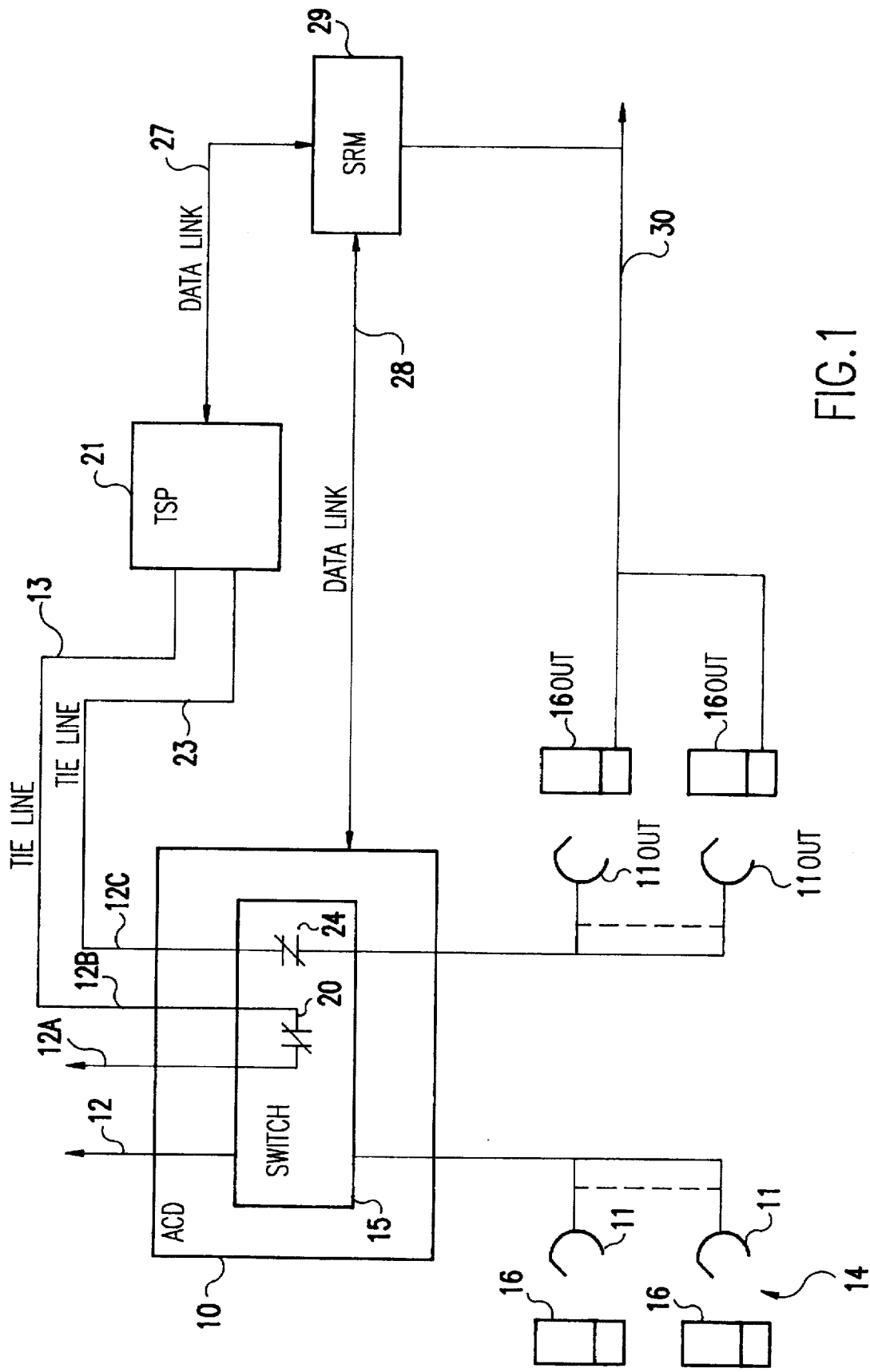
FIG. 1 is a block diagram of an add-on outbound system for automatic call distributors in accordance with the teachings of this invention.

Referring now to FIG. 1, an automatic call distributor (ACD) 10, of the type commercially available from a number of vendors and in widespread use, has a number of telephone trunks 12 connected to it. Although not limited thereto, the trunks in the specific embodiment of the invention described herein, are T1 trunks.

As will be appreciated by those skilled in the art, automatic call distributors include a computer driven switch 15 to connect incoming calls on trunks 12 to an available one of a plurality of agent stations indicated by the general reference number 14. Each agent station 14 has a headset 11 for two way voice communication over the trunks 12 and a data terminal 16 connected to the ACD 10 in order to display and enter data.

As will also be appreciated by those skilled in the art, the switch 15 in a typical automatic call distributor takes from 300–1000 milliseconds to switch an incoming call to an available agent. This elapsed switching time is satisfactory for inbound calls because an incoming call is originated by the caller, who accepts an interval up to a second or more between the end of the ringing signals and the start of the agent greeting to the caller. A switching time on the order of 300–1000 milliseconds is not satisfactory for outbound calls. In an outbound calling situation, it is important that the agent hear the called party's initial greeting (i.e. hello), or at least the majority of the initial greeting, in order to be able to respond appropriately to the called party. The interval between the called party placing the phone in an off-hook condition and speaking is typically from about 120–500 milliseconds but the off-hook signal may be delayed substantially with respect to the actual off-hook condition. Therefore, in order to ensure the agent hears at least a substantial portion of the initial called party's greeting, the switching time for outbound calls should be fast enough that it can respond to detection of the start of the called party's voice greeting and switch the call to an available agent in time for the agent to hear the majority of the greeting. To meet this criteria, a switching time on the order of 20–50 milliseconds is required.

In accordance with the teachings of this invention, the ACD switch 15 establishes a semipermanent connection 20 between outbound trunks 12A and 12B. This semipermanent connection 20 of previously switched circuits (i.e. called a nailed connection in the telephony art) between T1 trunks 12A and 12B will support twenty-four voice channels. If a larger number of channels is needed, or desired, additional trunks can be nailed together along with the further connections as hereinafter described. Of course, as pointed out above, the invention is not limited to the use of T1 trunks and T1 connections except to the extent that such a limitation may be pointed out particularly in the claims.

A T1 connection 13 connects the nailed up trunk 12B to a telephony server platform (TSP) 21 and another T1 connection 23 connects the TSP 21 to a trunk 12C connected to the ACD 10. The ACD switch 15 establishes another semipermanent connection 24 between the trunk 12C and a group of agent stations designated in the drawing 14OUT, which agent stations are thus semipermanently assigned to outbound operation.

The TSP 21 performs the functions of outbound call launching on trunk 12A, call progress detection to determine when a launched call has been answered, agent selection to determine those agents available to take a call, and fast (under 100 milliseconds) call switching of answered calls on trunk 12A to an available agent headset 11OUT via the nailed up connection 20 from trunk 12A to trunk 12B, the connection 13 from trunk 12B to the TSP 21, the connection 23 from the TSP to trunk 12C, and the nailed up connection 24 from trunk 12C to the agent headsets 11OUT. The TSP 21 may be comprised of voice digital signal processing boards, which are commercially available from several vendors. A data link 27 couples the TSP 21 to a system resource manager (SRM) 29, which includes a suitable outbound application program to fetch from storage numbers to be dialed and control the pacing and launching of the outbound calls via TSP 21. A data line 30 transfers called party data to and from the terminals 16OUT and the SRM 29. A data link 28 connects call statistics data from the inbound call distributor 10 to the SRM 29, which data can be used by the call pacing algorithm.

In operation, to add outbound call capability to an existing inbound automatic call distributor, the ACD switch 15 establishes a nailed up connection between a pair of ACD trunk ports 12A and 12B. The switch also establishes a nailed up connection between another ACD trunk port 12C and the agent headsets 11OUT for the agent stations which are semipermanently assigned to outbound operation. A voice connection 13 connects ACD trunk port 12B to the TSP 21, which performs the functions of call progress detection and call switching. The TSP 21 switches outbound calls that it classifies as answered to an available agent via voice connection 23 from the TSP 21 to the ACD trunk port 12C, which is nailed up to the agents assigned to outbound call operations.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An add-on system to provide outbound call capability to an automatic call distributor (ACD), said ACD including an ACD switch for connecting ACD telephone trunk ports to a selected one of a plurality of agent head sets, said system comprising in combination:

said ACD switch establishing a first nailed up connection between a first ACD trunk port connected to a telephone trunk and a second ACD trunk port and establishing a second nailed up connection between a third ACD trunk port and a subgroup of said plurality of agent head sets;

a first voice connection between said second ACD trunk port and a telephony server platform that provides high-speed call switching; and a second voice connection between said telephony server platform and said third ACD trunk port, whereby said telephony server platform switches answered outbound calls on said ACD telephone trunk to an agent head set.

2. An add-on system to provide outbound call capability to an automatic call distributor as in claim 1 further including a system resource manager and a first data link between said system resource manager and said ACD and a second data link between said system resource manager and said telephony server platform.

3. An add-on system to provide outbound call capability to an automatic call distributor as in claim 2 including a third data link between said system resource manager and data terminals associated with said subgroup of said plurality of agent head sets.

* * * * *